(No Model.) 3 Sheets—Sheet 1.

C. L. CHAPMAN.
DUMPING CAR.

No. 549,089. Patented Oct. 29, 1895.

(No Model.) 3 Sheets—Sheet 2.

C. L. CHAPMAN.
DUMPING CAR.

No. 549,089. Patented Oct. 29, 1895.

Witnesses

Inventor

Attorney.

(No Model.) 3 Sheets—Sheet 3.

C. L. CHAPMAN.
DUMPING CAR.

No. 549,089. Patented Oct. 29, 1895.

Witnesses
Inventor
Attorney.

UNITED STATES PATENT OFFICE.

CHAUNCEY LEWIS CHAPMAN, OF DUNLAP, IOWA.

DUMPING-CAR.

SPECIFICATION forming part of Letters Patent No. 549,089, dated October 29, 1895.

Application filed October 16, 1893. Serial No. 488,347. (No model.)

*To all whom it may concern:*

Be it known that I, CHAUNCEY LEWIS CHAPMAN, a citizen of the United States, residing at Dunlap, in the county of Harrison and State of Iowa, have invented certain new and useful Improvements in Dumping-Cars; and I do hereby declare the following to be a full, clear, and exact description of the invention, such as will enable others skilled in the art to which it appertains to make and use the same.

This invention relates to a new and improved dumping-car, and has for its objects, first, the production of simple and highly-efficient means for dumping and reseating the box or boxes of the car; secondly, to provide a dumping-car, the operation of the tilting boxes and the brakes being under the control of the engineer of a train of such cars, and, thirdly, to provide a car in which the air mechanism performs the function of dumping the cars and operating the brakes independently of each other.

To these ends the invention consists, primarily, of a car having two pivotally-mounted longitudinally-arranged boxes, means for holding said boxes locked in position, and means for dumping and reseating the same.

The invention further consists of a car having two pivotally-mounted longitudinally-arranged boxes, doors pivotally connected to said boxes and alternately unlocked when said boxes are tilted, and means for dumping and reseating said boxes under the control of the engineer.

The invention further consists of a car having mechanism under the control of the engineer for tilting the boxes of a car or cars and reseating and locking the same and also for applying and releasing the brakes, each capable of being operated independently of the other.

The invention further comprises the details of construction, combination, and arrangement of parts, substantially as hereinafter fully set forth, and particularly pointed out in the claims.

Figure 1:
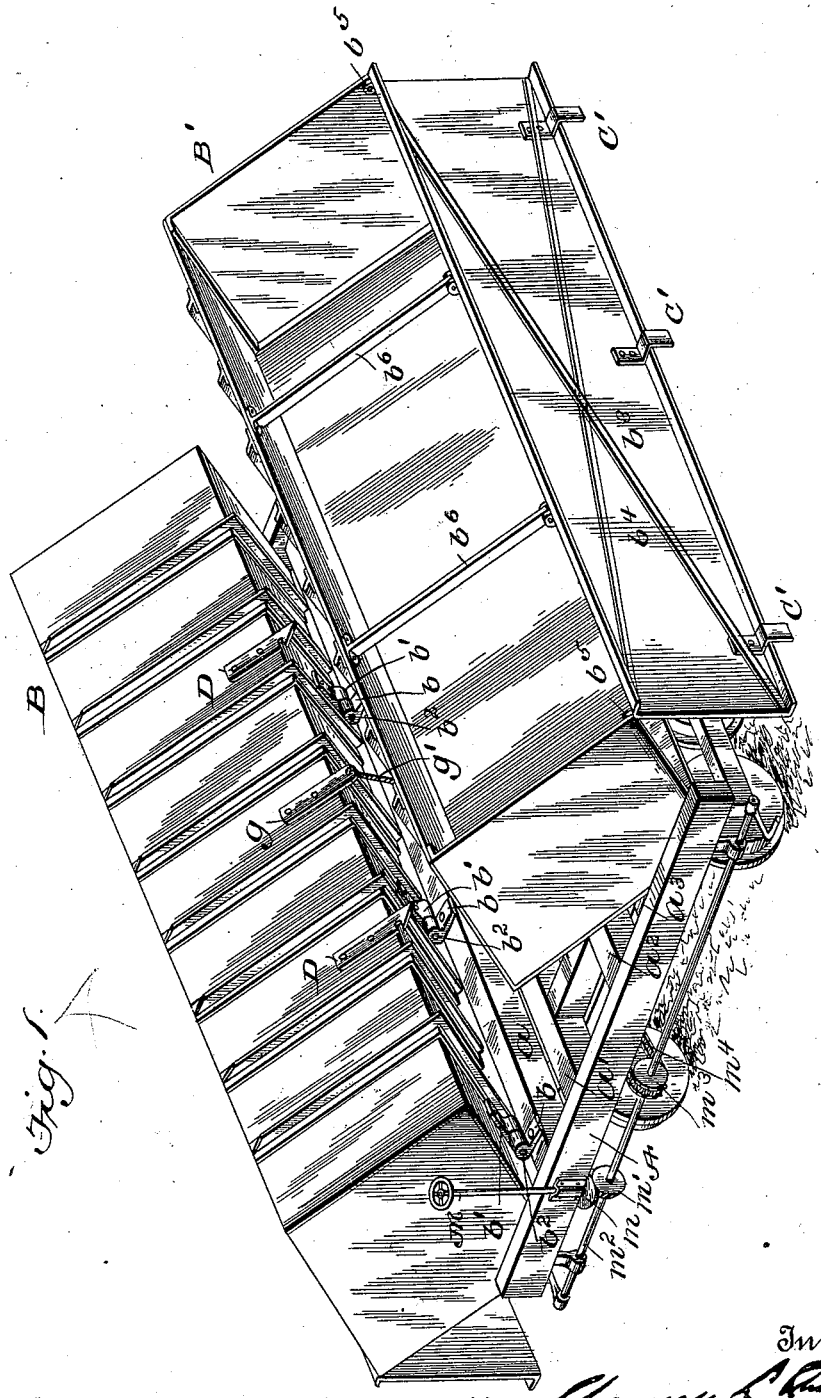
Figure 2:
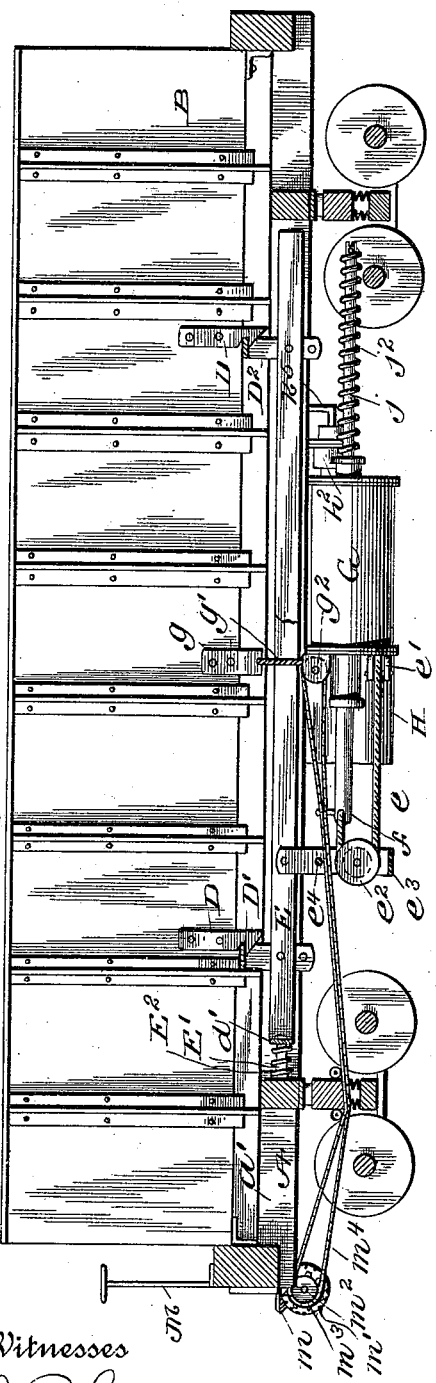
Figure 3:
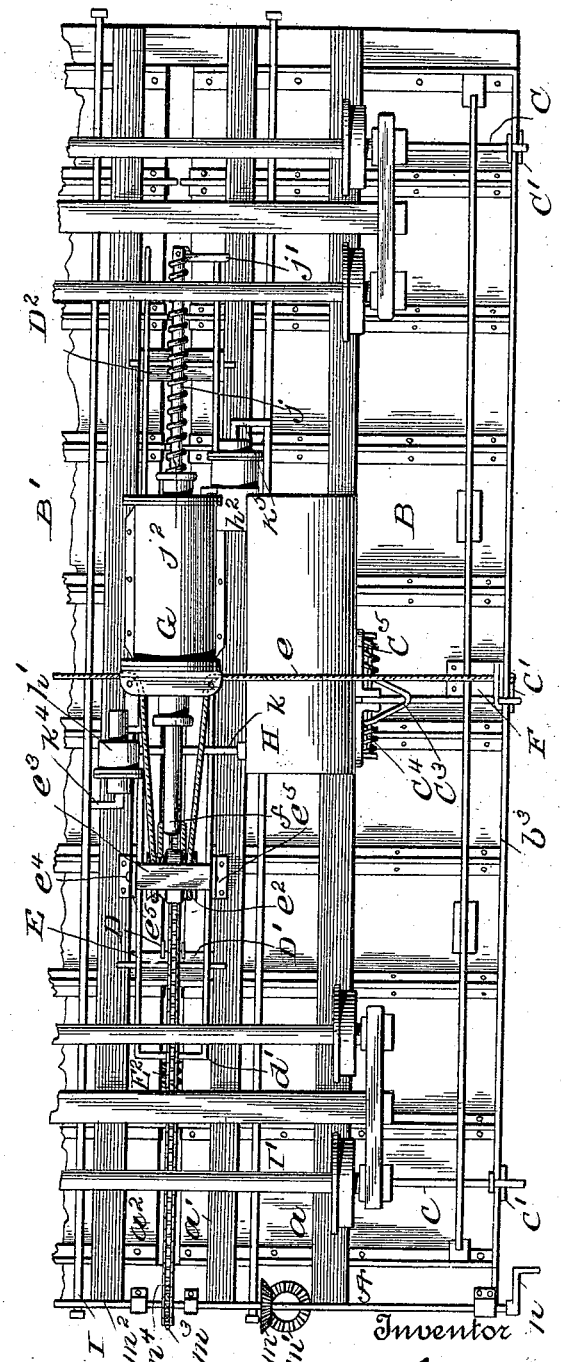
Figure 4:
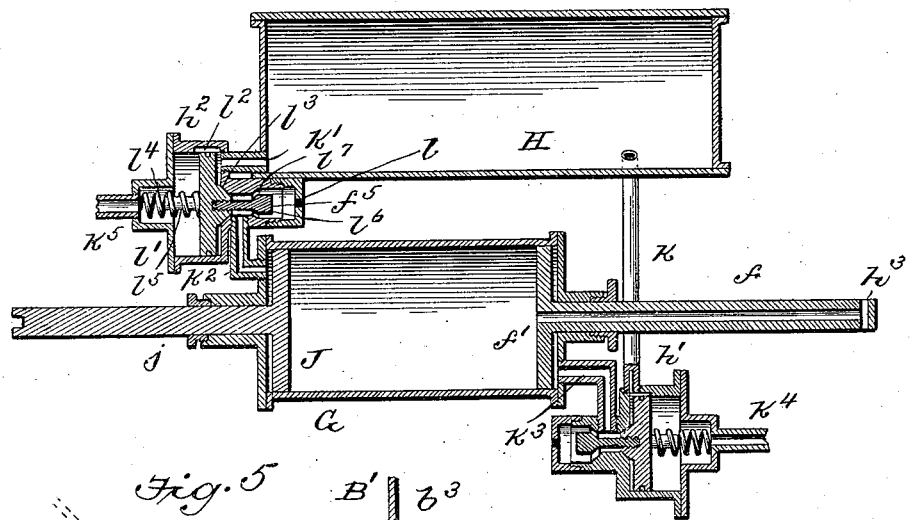
Figure 5:
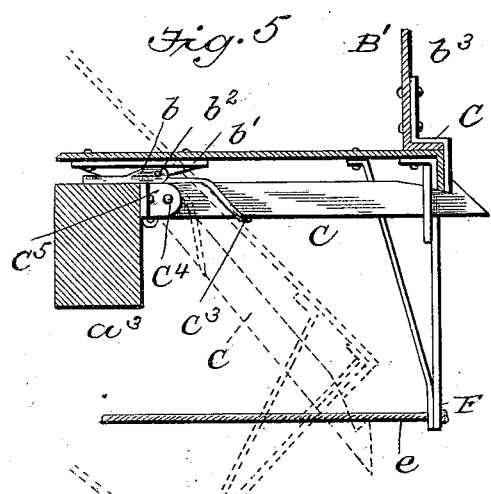
Figure 6:
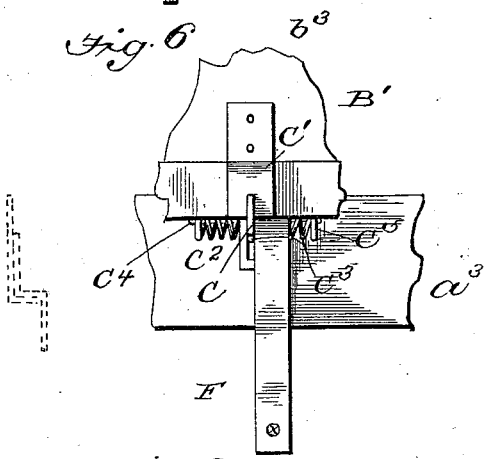
Figure 7:
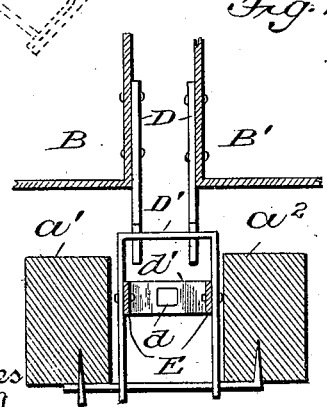
Figure 8:
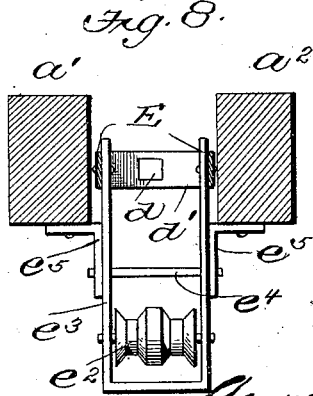

In the accompanying drawings, Figure 1 is a view in perspective of a car constructed in accordance with my invention, the boxes being shown tilted for discharging their contents. Fig. 2 is a central longitudinal sectional view, some of the parts being in side elevation. Fig. 3 is a bottom plan view with parts broken away. Fig. 4 is an enlarged horizontal sectional view of the air-reservoir, cylinder, and adjuncts. Fig. 5 is an enlarged detail sectional view of a portion of one of the dumping-boxes. Fig. 6 is a detail with parts broken away, showing the hooked arm for holding the door of the dumping-box closed. Figs. 7 and 8 are enlarged detail views.

Referring to the drawings, A designates the framework of the car comprising four longitudinal timbers $a$ $a'$ $a^2$ $a^3$ and cross-timbers $a^4$ $a^4$, secured to the ends of said longitudinal timbers, said cross-timbers being slightly above the latter, forming a bulkhead to receive the thrust of the dumping-boxes.

The dumping-boxes B B' are pivotally connected to the outer longitudinal timbers $a$ and $a^3$ by means of overlapping plates $b$ $b'$ and bolt $b^2$, as shown in Fig. 5. The bed or framework A is of such width that the center of gravity of each dumping-box falls within the pivotal connections of said boxes toward the longitudinal center of the car, thereby requiring applied power to tilt the same. These boxes are open at the top and are provided with longitudinally-extended doors $b^3$ on their outer sides, said doors being provided with truss-rods $b^4$. These doors are pivotally connected at the top to the ends of the boxes, as shown at $b^5$, and are additionally supported in proper position by intermediate cross-bars $b^6$, to which they are pivotally connected, said cross-bars at their inner ends being rigidly attached to the inner sides of the boxes. At their centers and ends these doors are held in place, when the boxes are in their normal horizontal positions, by means of arms C, having outer hooked ends which engage stepped-like plates C', secured to the lower edges of said doors and fitting down against the outer angular edges of the bottoms of said boxes. These hooked arms are held to their positions by means of coiled springs $C^2$, having central loops $C^3$ bearing against said arms, said springs being coiled around the pivot-rod $C^4$, held by brackets $C^5$, attached to the outer timbers of the framework. The boxes and hooked arms C being mounted on different pivots, the doors are free to swing outward away from the boxes when the latter are tilted, as seen in Fig. 5.

To the inner sides of the boxes are connected depending hooked arms D, oppositely arranged. These arms are designed to be engaged by the upper cross-bars of stirrups D' D², carried by two longitudinal parallel bars E, located between central timbers $a'$ $a^2$. Through an opening $d$ in the end bar $d'$, connecting these bars E, projects a short rod or post E', secured to the cross-bar of the framework. A coiled spring E², encircling said rod or post and bearing against said bar $d'$, serves to hold the stirrups D' D² in engagement with the hooked arms D.

F designates brackets depending from the bottoms of the boxes at about the centers thereof. To the lower ends of these brackets are connected the outer ends of ropes or chains $e$, which are carried inwardly and passed around pulleys $e'$, supported by the head of an air-cylinder G, and thence beneath and over a pulley $e^2$, and then connected to the rod $f$ of a piston $f'$ movable in said air-cylinder. The pulley $e^2$ is double grooved, and is mounted in a stirrup $e^3$, fulcrumed on a rod $e^4$, supported by right-angular plates $e^5$ connected to the framework A. The upper ends of the side bars of this stirrup are pivotally connected to the parallel bars E. Hence by the application of air to cylinder F the piston-rod is moved inward and the strain upon the ropes or chains $e$ will cause stirrup $e^3$ to swing on its fulcrum, thereby forcing the end cross-bar of parallel bars E against spring E² and effecting the disengagement of stirrups D' D² and hooked arms D, and at the same time said ropes or chains $e$ pulling inwardly on the brackets F will effect the tilting or dumping of the boxes. For returning the dumping-boxes to their normal position I attach two straps $g$ to the inner sides of said boxes, and to the said straps connect ropes or chains $g'$, which, after being passed under pulleys $g^2$, the brackets of which are secured to the head of air-cylinder G, are connected to the outer end of piston-rod $f$. Upon the return stroke of the piston, after having tilted the boxes, strain is released from ropes or chains $e$ and is applied to the ropes or chains $g'$, effecting the reseating of said boxes, which latter will be at once locked by the mechanism above described, the stirrups being forced into engagement with arms D by the spring-pressed bars E.

In order to operate the dumping-boxes by compressed air, I employ, in connection with air-cylinder G, a reservoir H, valves $h'$ and $h^2$, and train-pipes I I', by which the different mechanisms are operated and controlled by suitable appliances attached to the engine and governed by the operator in charge. The piston $f'$ is movable in cylinder G, and its rod $f$ is made hollow and provided with lateral ports $h^3$ at its outer end. A second piston J is also movable in this cylinder G, and its rod $j$ is connected at its outer end to brake-lever $j'$. Upon this piston being forced inward the brakes are applied to the wheels, and when air-pressure is released from cylinder G the brakes are freed under the action of spring $j^2$, encircling said rod $j$. The air-reservoir H is connected to valve $h'$ by a pipe $k$ and to the valve $h^2$ by pipe $k'$. The valve $h^2$ connects with air-cylinder G by pipe $k^2$, while the valve $h'$ is connected by a pipe $k^3$. The valves $h'$ and $h^2$ are respectively connected to train-pipes I and I' by pipes $k^4$ and $k^5$. Each of these valves $h'$ and $h^2$ being similarly constructed, the description of one will suffice for both, and therefore I will describe the valve $h^2$, which controls the working of the brakes. When in the position in which valve $h^2$ is shown in Fig. 4, the air-reservoir H and train-pipe I are charged to the necessary capacity. In this position exhaust from cylinder G is opened through pipe $k^2$ and exhaust-port $l$, releasing piston J from all pressure. The vacuum created in cylinder G by the rearward movement of piston J is supplied with air entering through the hollow piston-rod $f$. The air, in charging reservoir H, entered valve-casing $l'$ through pipe $k^5$, and passing through groove $l^2$ in the inner surface of said casing traveled to said reservoir through pipe $k'$. The valve is shown held against its seat $l^3$ by a spring $l^4$, which encircles a short projection $l^5$ of said valve.

From the opposite face of the valve extends a rod $f^5$, having a flared end $l^6$, designed to fit against a seat $l^7$ of the valve-casing. On applying air to cylinder G a slight reduction of air-pressure is made in train-pipe I', the pressure being retained in train-pipe I. The pressure of air in reservoir being now greater forces the valve $h^2$ as against the action of its spring, effecting the seating of the flared end $l^6$ of rod $l^5$, thus closing the exhaust-passage and at the same time closing groove $l^2$ and opening up communication through pipe $k^2$ with cylinder G, thus forcing piston J inward and setting the brakes. To release the brakes the required pressure in train-pipe I' is again restored to equalize that in the air-reservoir, allowing spring $l^4$ to force the valve to its seat $l^3$, thus opening up the exhaust-port and permitting the return movement of piston J under the action of its spring. These movements are accomplished independent of the dumping mechanism.

When it is desired to operate the mechanism for dumping and reseating the boxes, a reduction of air-pressure is made in train-pipe I, while train-pipe I' retains its normal pressure. This reduction in pipe I causes the valve $h'$ to operate similarly to that described in the operation of the brake, allowing the air to force piston $f'$ inward, releasing the locking mechanism and dumping the boxes, as stated. The piston $f'$ being now at its extreme end of travel—namely, at the end of cylinder opposite to that shown in Fig. 4—is against piston J. To effect the return of the dumping-boxes to their normal position, air is restored to train-pipe I, thus opening up the exhaust from in front of piston $f'$, and by operating or setting the brakes as previously described the piston J forces said piston $f'$ back to its original position, and in this movement the strain on ropes or chains $g'$ effects the reseating of the boxes.

In addition to the means above described for operating the boxes by compressed air, the same may be accomplished by hand mechanism. In Figs. 2 and 3 I have shown a hand-wheel shaft M at the end of the framework, and having a bevel gear-wheel $m$ meshing with a similar wheel $m'$ on a horizontal shaft $m^2$, depending from the under side of the car-frame. On this shaft is a sprocket-wheel $m^3$, around which is passed a chain $m^4$, which, after being passed beneath rollers $m^5$, one end is fastened to the outer end of piston-rod $f$. The other end of said chain, after being passed over pulley $g^2$, is brought back and attached to the end of said piston-rod, or this shaft $m^2$ may be operated by cranks $n$ on the ends of said shaft. This last described mechanism is designed for operating the dumping-boxes independent of air-pressure.

I claim as my invention—

1. In a dumping-car, the combination with the frame-work, of the longitudinally-disposed boxes pivoted to said frame-work, the doors pivoted to said boxes at their upper ends, the cross-bars to which said doors are also pivoted, and the spring pressed hooked arms also pivoted to said frame-work at a point different from the pivots of said boxes, substantially as and for the purpose set forth.

2. A dumping car having two longitudinally disposed pivoted boxes provided with opposite depending hooked arms at their inner sides, spring-actuated mechanism having upwardly projecting portions for engaging said hooked arms, means for releasing said mechanism and tilting said boxes, and means for reseating the latter, substantially as set forth.

3. A dumping car comprising two boxes pivotally mounted, a movable or sliding rod, connections between said rod and the inner and outer portions of said boxes, and means for moving said rod in opposite directions, whereby said boxes can be tilted and reseated, substantially as set forth.

4. A dumping car, comprising two boxes pivotally mounted, locking mechanism for holding said boxes in their normal positions, a movable or sliding rod, connections between said rod and the inner and outer portions of said boxes, and connections between said rod and said locking mechanism, substantially as set forth.

5. A dumping car, comprising two boxes pivotally mounted, a compressed-air cylinder, a piston movable therein, spring-actuated mechanism for locking said boxes, means for tilting the latter connected to said piston, and means for reseating said boxes also connected to said piston, said spring-actuated locking mechanism being operated by the movement of said piston, substantially as set forth.

6. In a dumping car, the combination with the frame-work, of two boxes pivotally secured at their bottoms to said frame-work, a compressed-air cylinder, a piston movable therein, and connections between said piston and the inner and outer portions of the bottoms of said boxes, substantially as set forth.

7. In a dumping-car, the combination of tilting boxes, an air-cylinder, and two pistons movable therein, one for operating tilting mechanism connected to said boxes, and the other for operating brake-mechanism, substantially as set forth.

8. In a dumping-car, the combination with the frame-work, of tilting boxes pivoted to said frame-work, an air-cylinder, a piston therein, brackets depending from the under sides of said boxes, ropes or chains connected to said brackets and also to said piston, and pulleys over which said ropes or chains are passed, substantially as set forth.

9. In a dumping-car, the combination with the frame-work, of tilting boxes pivoted to said frame-work having brackets depending from their bottoms, straps depending from the inner sides of said boxes, an air-cylinder, a piston therein, ropes or chains connecting said arms and straps to said piston, and pulleys over which said ropes or chains are passed, substantially as set forth.

10. In a dumping car, the combination of the tilting boxes, hooked arms depending therefrom, locking mechanism for engaging said hooked arms, brackets depending from the bottoms of said boxes, straps connected to the inner sides of the latter, an air-cylinder, a piston therein, ropes or chains connecting said brackets and straps to said piston, and means for operating said locking mechanism when said ropes or chains are operated, substantially as set forth.

11. In a dumping-car, the combination of the tilting boxes having hooked arms and straps extended from their inner sides and brackets depending from their bottoms, stirrups for engaging said hooked arms, spring-pressed bars carrying said stirrups, the pivoted stirrup connected to said bars, a roller mounted in said latter stirrup, an air-cylinder, a piston therein, ropes or chains connected to said brackets of said boxes and also to said piston, pulleys attached to said cylinder around which said ropes or chains are passed, and ropes or chains connecting said straps to said piston, substantially as set forth.

12. In a dumping-car, the combination of the tilting boxes having outer hinged doors, hooked arms engaging said doors, springs bearing against said arms, brackets depending from the bottoms of said boxes, an air cylinder, a piston movable therein, movable stirrups for engaging and holding said boxes, a pivoted stirrup for moving said former stirrups, the ropes or chains engaging said movable stirrup and connecting said depending arms to said piston, and the rope or chain also connecting said piston to the inner sides of said boxes for reseating the same, substantially as set forth.

13. In a dumping-car, the combination with the tilting boxes, and the cylinder having a piston therein, of connections between said piston and the inner and outer portions of said boxes, locking mechanism, and hand-dumping mechanism, comprising two shafts having bevel gearing, a sprocket wheel on one of said shafts, a chain connected at its ends to said piston, and rollers around which said chain is passed, substantially as set forth.

14. In a dumping-car having tilting boxes, the combination of the air-cylinder having a piston for tilting said boxes, a second piston connected to the brake-lever, and a spring acting on said latter piston, substantially as set forth.

15. In a dumping-car, the combination with the tilting boxes, of the air cylinder having two pistons, one for tilting said boxes and the other for operating the brakes, automatic valves connected to said cylinder, and the train-pipes communicating with said cylinder through said valves, substantially as set forth.

16. In a dumping-car, the combination of the tilting boxes, the air-cylinder, the train pipes, the valves connecting the latter to said cylinder, and the two pistons located in said cylinder, one of said pistons having a hollow rod and connected to said tilting boxes, and the other one of said pistons having spring pressure and connected to the brake mechanism, substantially as set forth.

17. In a dumping-car, the combination with the tilting boxes, of the air cylinder having two pistons, one of which has its rod made hollow and provided with ports at its outer end, the spring acting on the other one of said pistons, connections between the latter and the brakes, connections between the other piston and said tilting boxes for unlocking, tilting and reseating said boxes, automatic valves, an air reservoir, connections between said valves and said reservoir and cylinder, and the train-pipes communicating with said valves, substantially as set forth.

CHAUNCEY LEWIS CHAPMAN.

Witnesses:
FRED CURTIS,
DAVID TRUMBULL CHILD.